(12) United States Patent
Fidlin et al.

(10) Patent No.: US 7,139,654 B2
(45) Date of Patent: Nov. 21, 2006

(54) METHOD FOR SYNCHRONIZING A GEARBOX AND DEVICE FOR DAMPING THE VIBRATIONS IN GEARBOX, ESPECIALLY DURING SYNCHRONIZATION

(75) Inventors: Alexander Fidlin, Karlsruhe (DE); Boris Serebrennikov, Buehl (DE); Gunter Hirt, Kongsberg (NO)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 102 days.

(21) Appl. No.: 10/485,973

(22) PCT Filed: Aug. 1, 2002

(86) PCT No.: PCT/DE02/02829

§ 371 (c)(1),
(2), (4) Date: Apr. 23, 2004

(87) PCT Pub. No.: WO03/016087

PCT Pub. Date: Feb. 27, 2003

(65) Prior Publication Data

US 2005/0003929 A1    Jan. 6, 2005

(30) Foreign Application Priority Data

Aug. 6, 2001    (DE) .................. 101 38 570

(51) Int. Cl.
B60W 10/02    (2006.01)
G06F 19/00    (2006.01)
(52) U.S. Cl. .................. 701/54; 701/66; 477/115

(58) Field of Classification Search .................. None
See application file for complete search history.

(56) References Cited

U.S. PATENT DOCUMENTS

| 5,407,401 | A | 4/1995 | Bullmer et al. ............. 477/110 |
| 5,573,477 | A | 11/1996 | Desautels et al. ........... 477/109 |
| 5,603,672 | A | 2/1997 | Zhang ......................... 477/110 |
| 5,755,639 | A | 5/1998 | Genise et al. ............... 477/111 |
| 5,822,708 | A | 10/1998 | Wagner et al. ................ 701/54 |
| 6,246,941 | B1 | 6/2001 | Sayman ....................... 701/51 |
| 6,308,125 | B1 * | 10/2001 | Gleason et al. ............... 701/67 |
| 6,468,182 | B1 * | 10/2002 | Brandt et al. ................. 477/98 |
| 2003/0054920 | A1 | 3/2003 | Berger et al. ................. 477/70 |

FOREIGN PATENT DOCUMENTS

| DE | 3334711 | 4/1985 |
| DE | 4204401 | 8/1993 |
| DE | 4309903 | 5/1994 |
| DE | 4333899 | 7/1995 |
| DE | 10101597 | 11/1996 |
| DE | 19536320 | 4/1997 |
| DE | 19544516 | 6/1997 |
| DE | 19616960 | 11/1997 |
| DE | 19939334 | 3/1998 |
| DE | 10011694 | 1/2001 |
| DE | 19963746 | 7/2001 |
| EP | 0628443 | 12/1994 |
| GB | 2305743 | 4/1997 |
| WO | 02078997 | 10/2002 |

* cited by examiner

Primary Examiner—Michael J. Zanelli
(74) Attorney, Agent, or Firm—Davidson, Davidson & Kappel, LLC

(57) ABSTRACT

A method for synchronizing a gearbox in a vehicle, whereby the engine and/or the clutch are controlled in a suitable manner during synchronization. In addition, a device for damping the vibrations in a gearbox, especially during synchronization, wherein at least one torsion damper is provided.

42 Claims, 9 Drawing Sheets rpm and torque curves with optimum engine control

METHOD FOR SYNCHRONIZING A GEARBOX AND DEVICE FOR DAMPING THE VIBRATIONS IN GEARBOX, ESPECIALLY DURING SYNCHRONIZATION

BACKGROUND

The present invention relates to a method for synchronizing a transmission and a device for damping vibrations in a transmission, in particular during synchronization.

Methods of synchronizing a transmission and devices for damping the vibration of a transmission, in particular during synchronization, are known from automotive engineering.

SUMMARY OF THE INVENTION

An object of the present invention is to provide a method for synchronizing a transmission in which the synchronization operation is performed as rapidly and as comfortably as possible.

The present invention provides a method for synchronizing a transmission, in which the engine and/or the clutch are controlled suitably during synchronization.

This may be accomplished by an engine control in which the engine is controlled without any change in clutch torque, e.g., on the power-shift clutch.

Because of the comfort requirements, the torque on the power-shift clutch may be changed only slowly and in a small range. Therefore, the synchronization operation should be performed essentially through the change in the engine torque. This results in the problem that the engine should be controlled suitably without a change in the torque of the power-shift clutch.

According to the present invention, the gear is synchronized only through engine control. The power-shift clutch transmits a constant torque to the vehicle during the synchronization operation. According to an embodiment of the present invention, the synchronization may be divided at least into two phases. During a first phase, the greatest possible torque difference may be applied. As the set point for the engine control, $M_{mot}^{setpoint}=0$ may be preselected for the engine torque for upshifting. The drag torque may act here independently of the engine control. In downshifting, maximum engine torque $M_{mot}^{setpoint}=M_{max}$ is preferably preselected as the manipulated variable. During a second phase, the engine torque returns to the initial value and the engine set point torque is $M_{mot}^{setpoint}=M_0$ where $M_0$ denotes the initial engine torque.

The point in time $t_u$ at which the set point for the engine control is to be switched may preferably depend on the rpm difference to be synchronized and on the load. The time of switching may either be stored in an engine characteristics map and/or determined by the following formula, whereby a distinction is made between upshifting and downshifting:

$$t_u = \frac{J_{mot} \cdot \Delta\omega_{mot}}{M_0} \text{ (upshifting)}$$

$$t_u = \frac{J_{mot} \cdot \Delta\omega_{mot}}{M_0 - M_{max}} \text{ (downshifting)}$$

where
$J_{mot}$=inertia of the engine;
$\Delta\omega_{mot}$=rpm difference to be synchronized;
$M_0$=initial engine torque;
$M_{max}$=maximum engine torque;
$t_u$=time of switching.

These equations are valid in particular in the case of identical time constants of the engine for the increase in torque ($T_{mot}^+$) and the decrease in torque ($T_{mot}^-$).

With this simplified and robust control strategy according to the present invention, the torque of the power-shift clutch is assumed to be constant during the synchronization operation. The kinetic torque obtained from the engine may then be calculated as the sum of the areas $S_1$ and $S_2$ obtained with a graphic plot of the actual engine torque over time.

Up to the point in time of switching $t_u$ the engine torque changes according to the following equation:

$$(M_{mot}-M_{drag})=-M_{drag}+(M_{drag}+M_0)\exp(-t/T_{mot})$$

$$M_0=M_{mot\_0}-M_{drag}=M_{LSK\_0}$$

where the engine torque at the point in time of switching is:

$$(M_{mot}-M_{drag})=-M_{drag}+(M_{drag}+M_0)\exp(-t_u/T_{mot})$$

The engine torque thus changes according to the following equation:

$$(M_{mot}-M_{drag})=M_0-(M_0-M_u)\exp(-(t-t_u)/T_{mot})$$

The areas $S_1$ and $S_2$ are calculated as follows:

$$S_1 = M_0 t_u - \int_0^{t_u} M_{mot} dt$$
$$= (M_0 + M_{drag})t_u + T_{mot}(M_{drag} + M_0)(\exp(-t_u/T_{mot})-1)$$

$$S_2 = (M_0 - M_u)\int_0^{\infty} \exp(-t/T_{mot}) dt$$
$$= -T_{mot}(M_{drag} + M_0)(\exp(-t_u/T_{mot})-1)$$

The total change in kinetic torque thus amounts to:

$$S=S_1+S_2=(M_0+M_{drag})t_u$$

The time of switching is calculated from this as follows by using the rpm difference that is to be synchronized:

$$t_u = \frac{J_{mot}\Delta\omega_{mot}}{M_0 + M_{drag}} = \frac{J_{mot}\Delta\omega_{mot}}{M_{mot\_0}}$$

The advantages of the control strategy proposed here include in particular the fact that it is simple and robust with respect to the dead time of the engine and it presupposes only a PT1-like engine performance. This strategy may be improved by additional "observers" to determine the prevailing drag torque and/or rolling resistance.

Furthermore, the method according to the present invention is advantageous in particular at a moderate rpm. Above an engine rpm of 5000, very good synchronization results are preferably achieved by the method according to the present invention. In the extreme case at approximately 6000 rpm, a time savings of approximately 0.06 s may be implemented due to the optimum control. Since the output torque remains unchanged during synchronization, in this case there are no comfort problems.

When the time constants differ greatly and the rpm difference is relatively small, the point in time of switching is defined by the following equation in the method according to the present invention:

$$\tau + \exp(-\tau) - \alpha \exp(-\alpha\tau) = c$$

$$\tau = t_u/T_{mot}^-, \alpha = T_{mot}^+/T_{mot}^-, c = \frac{J_{mot}\Delta\omega_{mot}}{M_0 T_{mot}^-} + 1 - \alpha$$

Accordingly the areas $S_1$ and $S_2$ are calculated as follows in the case of different time constants for the increase in torque $T_{mot}^+$ and the decrease in torque $T_{mot}^-$:

$$S_1 = (M_0 + M_{drag})t_u + T_{mot}^-(M_0 + M_{drag})(\exp(-t_u/T_{mot}^-) - 1)$$

$$S_2 = T_{mot}^+(M_0 + M_{drag})(\exp(-t_u/T_{mot}^+) - 1)$$

where $M_0 = M_{set\ point} - M_{drag}$.

The following equation holds for the switching time:

$$S_1 + S_2 = J_{mot}\Delta\omega_{mot} \text{ and/or}$$

$$\frac{t_u/T_{mot}^- + \exp(-t_u/T_{mot}^-) - 1 -}{T_{mot}^+/T_{mot}^-(\exp(-t_u/T_{mot}^+) - 1)} = \frac{J_{mot}\Delta\omega_{mot}}{(M_0 + M_{drag})T_{mot}^-}$$

With the following equations $$\tau = t_u/T_{mot}^-, \alpha = T_{mot}^+/T_{mot}^-, c = \frac{J_{mot}\Delta\omega_{mot}}{(M_0 + M_{drag})T_{mot}^-} + 1 - \alpha$$

the following equation holds for $\tau$:

$$\tau + \exp(-\tau) - \alpha \exp(-\alpha\tau) = c$$

For the parameter it holds that $1 \leq \alpha \leq 2$ (measured data). At $\alpha \neq 1$, the equation may only be solved numerically. At $\alpha = 1$, the solution is $\tau = c$, and the following equation holds:

$$t_u = \frac{J_{mot}\Delta\omega_{mot}}{M_0 + M_{drag}} = \frac{J_{mot}\Delta\omega_{mot}}{M_{mot\_0}}$$

This corresponds to the simple solution with the same time constants.

The results of the numerical solution and their analysis are given in Table 1 below:

TABLE 1

| c | Maximum deviation in the exact solution at $\alpha = 2$ (% of c) | $t_u$ (equation (23)) at $T_{mot}^- = 0.05$ s (s) | Maximum deviation in the switching time of $t_u$ in the exact solution (s) | Comments |
|---|---|---|---|---|
| 2 | 25% | 0.1 | 0.025 | (2–3) $T_{interrupt}$ |
| 3 | 10% | 0.15 | 0.015 | (1–2) $T_{interrupt}$ |
| 5 | 3% | 0.25 | 0.0075 | Deviation not significant |
| 10 | 0.2% | 0.5 | 0.001 | Deviation not significant |

This shows that the deviations in downshifting (the case $\alpha = 0.5$ could be critical) are approximately 4 times smaller. The situation in which the values for c are less than 3 is also possible, whereby the rpm difference to be synchronized is minor and the engine torque is large. In this case it is expedient not to perform the synchronization operation with the maximum torque difference but instead to use a moderate torque difference $(M_0 - M_{sync})$.

If the value for c is higher than 4, the switching time $t_u$ may be calculated by using the following equation:

$$t_u = \frac{J_{mot}\Delta\omega_{mot}}{(M_0 - M_{sync})}$$

In the case when the most accurate possible solution is required, this may be calculated preferably without floating-point operations as a function of c, $T_{mot}^-$, $T_{mot}^+$. An engine characteristics map for the function $\exp(-c)$ must be calculated and/or stored.

The advantages of this strategy include in particular its simplicity and robustness with respect to the variables such as the drag torque, the rolling resistance, and the dead time of the controlled system.

In addition, the method according to the present invention may include performing a control intervention on the power-shift clutch as well as on the internal combustion engine of the vehicle in the method for synchronization, in particular of a seamless transmission, in order to implement the fastest possible synchronization operation.

It has been recognized here that at the end of the seamless transmission synchronization operation, the rpm difference in the desired gear as well as the acceleration difference should both assume a value of 0 as accurately as possible. The synchronization operation should be ended as quickly as possible. Because of the comfort requirements, only small torque gradients are allowed on the power-shift clutch. Therefore, the synchronization operation should be implemented essentially through the change in the engine torque. Ultimately the engine torque should nevertheless achieve the original value.

According to the proposed method, a simple control may be employed during the first phase of the synchronization operation and the set point value of the engine torque may be brought to the original value and stabilized on the power-shift clutch during the second phase. For the control phase (first phase) it is indicative that both the engine torque as well as the clutch torque may be switched preferably twice. The first switch may take place, for example, as soon as the synchronization has begun. In upshifting, the set point torque of the engine may preferably be reduced to a value of zero, and the clutch torque may be increased as quickly as possible while taking into account the comfort factor. Conversely, in downshifting, the set point torque of the engine may be raised to the maximum torque, for example, and the clutch torque may be reduced as quickly as possible. The next switching of the set point torques may take place at different points in time. The engine torque may be switched to the maximum value in upshifting or switched to a value of zero in downshifting. The torque on the power-shift clutch may accordingly be reduced in upshifting and/or decreased in downshifting as rapidly as possible.

The switching points may preferably be determined from the engine characteristics map which depends on the initial load and/or the rpm difference to be synchronized and/or they may be stored.

It is also possible for the switching points in time to be calculated by using the following equation systems. Preferably the following computation model is used for this.

An internal combustion engine having a moment of inertia $J_{mot}$ and a vehicle having a moment of inertia $J_{Fzg}$ is taken into account here. The motion equations of the system may be described as follows:

$$J_{mot}\omega^*_{mot} = M_{mot} - M_{LSK} - M_{drag}$$

$$J_{Fzg}\omega^*_{Fzg} = M_{LSK} i_{LSK} - M_{FW}$$

where $M_{mot}$ is the controllable torque of the engine, $M_{LSK}$ is the controllable torque of the power-shift clutch, $i_{LSK}$ is the transmission ratio of the power-shift clutch, $M_{drag}$ is the uncontrollable drag torque and $M_{FW}$ is the rolling resistance of the vehicle converted into torque.

In this analysis, it may be assumed that both the engine and the power-shift clutch are describable as PT1 elements. This may be confirmed by suitable measurements, which also indicate a dead time, in particular in the internal combustion engine.

Accordingly, the engine performance is described as follows in terms of the technical control aspects:

$$T_{mot}M^*_{mot} + M_{mot} = \overline{M}_{mot} + u_{mot}$$

$$T_{LSK}M^*_{LSK} + M_{LSK} = \overline{M}_{LSK} + u_{LSK}$$

$T_{mot}$ and $T_{LSK}$ are the time constants of the internal combustion engine and/or the power-shift clutch. Constants $\overline{M}_{mot}$ and $\overline{M}_{LSK}$ together with controls $u_{mot}$ and $u_{LSK}$ determine the set point variables of the corresponding torques. Controls $u_{mot}$ and $u_{LSK}$ are limited. However, the reasons for these limits are varied. The internal combustion engine is unable to generate negative torque, the drag torque having already explicitly been taken into account. Therefore, it is advisable to reformulate the limits $0 \leq M_{mot} \leq M_{mot\ max}$ as follows:

$$\overline{M}_{mot} = M_{mot\ max}/2$$

$$|u_{mot}| \leq u_{mot\ max} = M_{mot\ max}/2$$

However, the requirement of the control of the power-shift clutch is determined by comfort and may be formulated as follows:

$$\overline{M}_{LSK} = M_{LSK}(t=0)$$

$$|u_{LSK}| \leq u_{LSK\ max} = \max(\text{degree}(M_{LSK}))/T_{LSK}$$

The system must still be completed with initial conditions and final requirements. The initial conditions are formulated at the point in time when the previous gear has been disengaged. At this point in time, the following holds:

$$\omega_{mot}(0) = \omega_0; \omega_{Fzg}(0) = \omega_0/i_1; M_{mot}(0) = M_0; \omega^*_{Fzg}(0) = \omega^*_{mot}(0)/i_1$$

The final requirements are formulated as follows: the velocities and the accelerations of both masses should conform to the subsequent gear, and the engine torque should correspond to the initial level:

$$\omega_{mot}(T) = i_2\omega_{Fzg}(T); \omega^*_{mot}(T) = i_2\omega^*_{Fzg}(T); M_{mot}(T) = M_{mot}(0) = M_0$$

Uniform equations and parameters are now introduced:

$$X_1 = M_{mot}; X_2 = M_{LSK}; X_3 = J_{mot}\omega_{mot}; X_4 = J_{Fzg}\omega_{Fzg}/i_{LSK}$$

$$M_W = M_{FW}/i_{LSK}; \overline{M}_{mot} = U_1; \overline{M}_{LSK} = U_2;$$

$$u_{mot\_max} = u_{1max}; u_{LSK\_max} = u_{2max};$$

-continued $$k_1 = i_1 i_{LSK} \frac{J_{mot}}{J_{Fzg}}; k_2 = i_1 i_{LSK} \frac{J_{mot}}{J_{Fzg}}.$$

The motion equations, the initial conditions, and the final requirements may then be rewritten according to the following equation system:

$$X_1^\bullet T_1 + X_1 = U_1 + u_1$$

$$X_2^\bullet T_2 + X_2 = U_2 + u_2$$

$$X_3^\bullet = X_1 - X_2 - M_S$$

$$X_4^\bullet = X_2 - M_W$$

$$X_1(0) = M_0$$

$$X_2(0) = M_{0\_LSK} = \frac{M_0 - M_S + k_1 M_W}{1 + k_1}$$

$$X_3(0) = J_{mot}\omega_{mot}(0)$$

$$X_4(0) = \frac{1}{k_1}J_{mot}\omega_{mot}(0)$$

$$X_1(T) = M_0$$

$$X_2(T) = M_{T\_LSK} = \frac{M_0 - M_S + k_2 M_W}{1 + k_2}$$

$$X_3(T) = k_2 X_4(T)$$

According to Pontriagin's "maximum principle," the Hamilton function $$H = \sum_i \psi_i f_i$$

which is introduced for this equation system above, may be represented in the form $X^* = f(X, U)$, where the unknown functions $\psi_i$ are determined by the conjugated equation system above:

$$\psi_i^* = -\frac{\partial H}{\partial x_i}$$

In the present case the Hamilton function and the conjugated system are in the following form:

$$H = \frac{U_1 + u_1 - X_1}{T_1}\psi_1 + \frac{U_2 + u_2 - X_2}{T_2}\psi_2 + (X_1 - X_2 - M_S)\psi_3 + (X_2 - M_W)\psi_4$$

$$\psi_1^* = \psi_1/T_1 - \psi_3; \psi_2^* = \psi_2/T_2 + \psi_3 - \psi_4; \psi_3^* = 0; \psi_4^* = 0$$

The general solution of the conjugated equation system is to be found with the following equation:

$$\psi_1 = C_1 e^{t/T_1} + C_3 T_1; \psi_2 = C_2 e^{t/T_2} + (C_4 - C_3)T_2; \psi_3 = C_3;$$
$$\psi_4 = C_4$$

$C_1$ to $C_4$ are constants that are determined. The Hamilton function may now be described explicitly:

$$H = \frac{U_1 + u_1 - X_1}{T_1}(C_1 e^{t/T_1} + C_3 T_1) +$$
$$\frac{U_2 + u_2 - X_2}{T_2}(C_2 e^{t/T_2} + (C_4 - C_3)T_2) +$$
$$(X_1 - X_2 - M_s)C_3 + (X_2 - M_W)C_4$$

The control will thus be the fastest when the Hamilton function is at a maximum with respect to the variables $u_1$, $u_2$. Accordingly it holds that:

$$u_1 = u_{1max} \text{sign}\left(C_1 e^{\frac{t}{T_1}} + C_3 T_1\right)$$

$$u_2 = u_{2max} \text{sign}\left(C_2 e^{\frac{t}{T_2}} + (C_4 - C_3)T_2\right)$$

Each of the functions in brackets may not change its sign more than once. Therefore, the optimum control may be described as follows:

$$u_1 = u_{10} - 2u_{10}\underline{1}(t - t_1)$$
$$u_2 = u_{20} - 2u_{20}\underline{1}(t - t_2)$$
$$u_{10} = \pm u_{1max}$$
$$u_{20} = \pm u_{2max}$$
$$\underline{1}(z) = \begin{cases} 0 \text{ if } z < 0 \\ 1 \text{ if } z > 0 \end{cases}$$

If this control is used in the equation system, the following solution is obtained when the initial conditions are taken into account:

$$X_1 = M_0 e^{-t/T_1} + (U_1 + u_{10})(1 - e^{-t/T_1}) - 2u_{10}(1 - e^{-(t-t_1)/T_1}) \cdot \underline{1}(t - t_1)$$

$$X_2 = M_{0\_LSK} e^{-t/T_2} + (U_2 + u_{20})(1 - e^{-t/T_2}) - 2u_{20}(1 - e^{-(t-t_2)/T_2}) \cdot \underline{1}(t - t_2)$$

$$X_3 = X_{30} + M_0 T_i (1 - e^{-t/T_1}) + (U_1 + u_{10})T_1(t/T_1 - 1 + e^{-t/T_1}) - 2u_{10}T_1\left(\frac{t - t_1}{T_1} + 1 - e^{\frac{t-t_1}{T_1}}\right) \cdot \underline{1}(t - t_1) - M_{0\_LSK}T_2(1 - e^{-t/T_2}) - (U_2 + u_{20})T_2(t/T_2 - 1 + e^{-t/T_2}) + 2u_{20}T_2\left(\frac{t - t_2}{T_2} + 1 - e^{\frac{t-t_2}{T_2}}\right) \cdot \underline{1}(t - t_2) - M_S t$$

$$X_4 = X_{40} + M_{0\_LSK}T_2(1 - e^{-t/T_2}) + (U_2 + u_{20})T_2(t/T_2 - 1 + e^{-t/T_2}) - 2u_{20}T_2\left(\frac{t - t_2}{T_2} + 1 - e^{\frac{t-t_2}{T_2}}\right) \cdot \underline{1}(t - t_2) - M_W t$$

This solution depends upon three unknown constants: switching times $t_1$ and $t_2$ and total time T. These are determined by three final requirements. If total time T is predetermined, the equations for $t_1$ and $t_2$ may be solved explicitly. Accordingly, the entire system is reduced to a single transcendent equation, the solutions to which may be stored in the form of an engine characteristics map. The efficacy of optimum control has been verified by simulations with MATLAB and ITI-SIM.

The calculated times for synchronization may be plotted as a function of rpm and load. Two trends are discernible. The time required for synchronization increases with the rpm difference to be overcome and decreases with an increase in load. These relationships may be explained with a very simple model.

The comfort-related restriction on the gradient of the torque on the power-shift clutch does not allow any noticeable change in torque during the synchronization phase. Therefore, the torque of the power-shift clutch may be assumed to be constant in first approximation. The torque is determined by the gear-disengagement phase. The deflection coupling of the "first" gear must be disengaged here. This means that the torque of the power-shift clutch corresponds in first approximation to the engine torque. If it is assumed at first that the control is infinitely fast, the torque of the engine may be reduced immediately and increased again suddenly only after synchronization. This yields the following motion equation for the engine to be synchronized:

$$J_{mot}\,\omega^* = -|M_{drag}| - M_{LSK}$$

If it is also assumed that the vehicle rpm does not change during the shifting operation, a simple equation for the synchronization time may be obtained:

$$\Delta t = \frac{\pi n}{30} \cdot \left(1 - \frac{i_2}{i_1}\right) \cdot \frac{J_{mot}}{|M_{drag}| + M_{mot\_0}}$$

If the time constants of the engine control are taken into account, it is discernible that the engine torque is switched twice. A final estimate of the synchronization time may be obtained in this way:

$$\Delta t = \frac{\pi n}{30} \cdot \left(1 - \frac{i_2}{i_1}\right) \cdot \frac{J_{mot}}{|M_{drag}| + M_{mot\_0}} + 2T_{mot}$$

This shows that the estimate corresponds very well to the times actually achievable and that low loads correlate with very long times.

As soon as the set point/actual rpm difference has fallen below a threshold, it is possible for a second phase of the method to begin according to a further embodiment of the present invention. The engine torque may preferably asymptotically approach the original level and the power-shift clutch must no longer be controlled in an advantageous manner but instead it is brought to the point of smoothing out the remaining rpm difference by a simple regulation (e.g., PI or PID regulator). The threshold which is also responsible for the transition to the second phase may also be determined from the engine characteristics map which depends on the initial load and the rpm difference to be synchronized and/or it may be stored.

This is explained below on the basis of regulation strategies. The switching points that are decisive for the control strategy described here respond to possible interference and initial conditions. Therefore, a simple regulation that functions fully automatically is proposed. A simple PI regulator is used for control of the power-shift clutch and the switching point of the engine control may preferably be determined by a PID regulator with limits. As soon as the value has fallen below a certain threshold of the rpm difference, the engine regulator may be switched off. The set point torque of the engine is equated with the desired end torque. The end regulation may be performed by the power-shift clutch regulator.

It may be assumed that there is no noticeable dead time in the control. In reality, however, there is a certain dead time. If this is known, it does not change anything for the optimum control. However, there may be changes for the regulation described here. In this case, a similar regulation may be used. The only difference is that the switch to the final regulation by the power-shift clutch regulator takes place when a threshold that depends on load and rpm is exceeded, this threshold being stored in the form of an engine characteristics map. The dead time may amount to approximately 0.1 s.

With the method proposed here, in particular with respect to speed, an optimum control for synchronization is implemented. The method according to the present invention may be used with any transmission systems.

A further or alternate object of the present invention is to provide a device for damping vibrations in a transmission so as to permit an effective synchronization operation for the transmission.

The present invention provides a device for damping vibrations in a transmission wherein at least one suitable torsion damper is provided.

The configuration and implementation of a torsion damper may thus be provided in a drive train of a motor vehicle, preferably having a seamless transmission, an electric transmission, or the like.

According to a further advantageous embodiment, the torsion damper used may be based on the principles of the dual-mass flywheel (DMF) and may be referred to as a DMF damper.

For an effective synchronization operation in a seamless transmission, very good vibration isolation is crucial in particular in the form-fitting part of the transmission. Adequate vibration isolation may not be guaranteed with conventional embodiments.

The embodiment according to the present invention involves the use of a DMF-like damper which is preferably effectively integrated into the seamless transmission-specific structure of the drive train.

It is also possible for the vibrations to be reduced through the regulating technology. However, the vibrations that occur have a very high frequency so that design or strategic measures are preferably used. As a measure involving the regulating technology, it is possible to provide for shifting to be performed with a slipping low-gear clutch.

Another possibility is to use the torsion damper, which also uses the additional mass of the power-shift clutch to combat engine-excited vibration like the secondary part of a DMF.

In a further embodiment of the present invention, the torsion damper, i.e., DMF damper, may be situated in the drive train. For example, the DMF damper may be situated upstream from both clutches, e.g., a low-gear clutch and a power-shift clutch.

It is also possible that the damper is situated between the two clutches mentioned above. The advantage of this embodiment is that the masses of the two clutches already present are also used for the damper. The damper may perhaps also be implemented downstream from the clutches, virtually in the transmission. This configuration is particularly appropriate when the mass of an electric machine implemented in the transmission may be used as a secondary part of the damper.

With all possible configurations, adequate isolation of vibration may be ensured through a suitable choice of the masses and rigidities.

Use of an arc spring damper as the torsion damper is particularly advantageous. The device according to the present invention may preferably be used in a seamless transmission, an electric transmission, or the like.

The patent claims filed with the application are formulation proposals without prejudice of the achievement of broader patent protection. The applicant reserves the right to claim additional feature combinations previously only disclosed in the description and/or the drawing.

The references used in the dependent claims indicate further refinements of the subject matter of the main claim by the features of the particular dependent claim. They are not to be understood as a waiver of obtaining an independent claim for the combination of features of the referenced dependent claims.

Because the subject matter of the dependent claims may form separate independent inventions with respect to the related art on the priority date, the applicant reserves the right to make them the subject matter of independent claims or division clarifications. They may furthermore also contain independent inventions having a design that is independent of the subject matter of the aforementioned dependent claims.

The exemplary embodiments are not to be understood as limitations of the present invention. Rather, numerous modifications and variants are possible within the present disclosure, in particular variants, elements, and combinations and/or materials that are obvious to those skilled in the art, for example, by combination or modification of individual features or elements or method steps described in the general description and embodiments as well as in the claims and contained in the drawing, resulting in a new object or new method steps or method step sequences via combinable features, including those concerning manufacturing, testing, and work methods.

BRIEF DESCRIPTION OF THE DRAWINGS

Other advantageous embodiments are derived from the claims and the accompanying drawing, in which:

DETAILED DESCRIPTION

Figure 1:
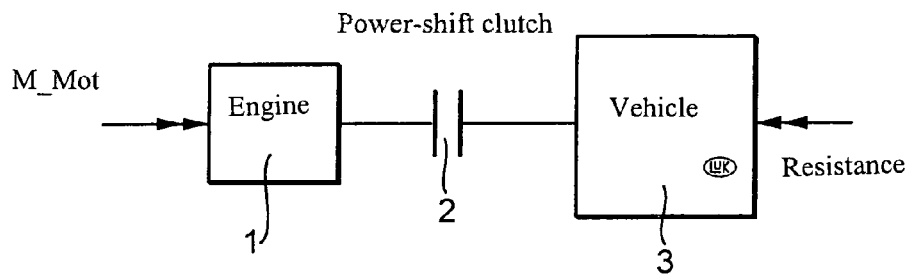
FIG. 1 shows a possible model for simulation of synchronization in a vehicle.

FIG. 1 shows a model including an engine 1 and a power-shift clutch 2 in a transmission of a motor vehicle 3 in a schematic representation. This model is used as the basis for simulation of synchronization.

Figure 2:
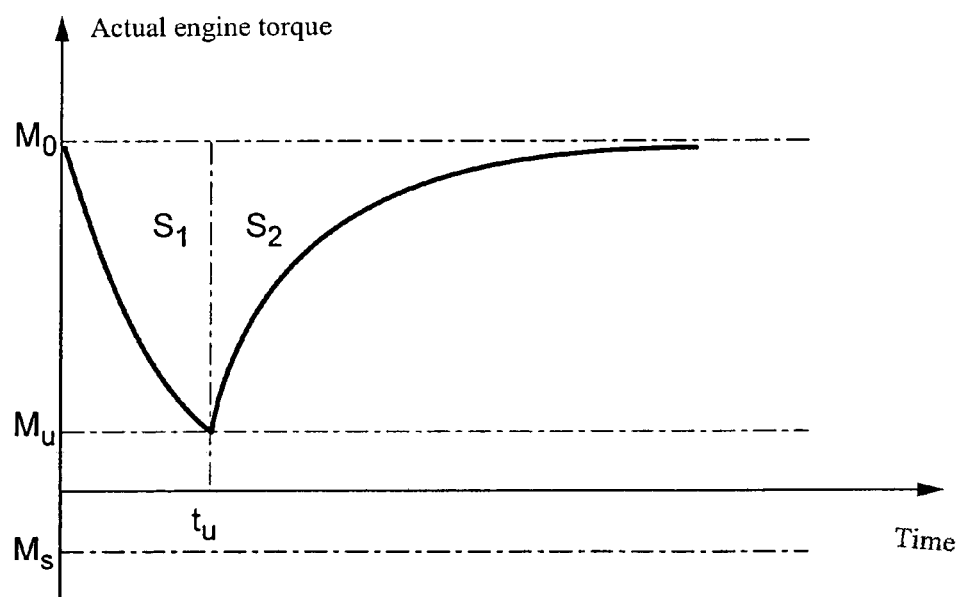
FIG. 2 shows a diagram of the actual engine torque during synchronization over time.

According to a simplified and robust control strategy according to the present invention the torque of power-shift clutch 2 is assumed to be constant during the synchronization operation. The kinetic torque which is subtracted from the engine torque of engine 1 may be calculated from the sum of areas $S_1$ and $S_2$ which are depicted in FIG. 2, which shows the actual engine torque during synchronization over time.

According to this, the engine torque changes according to the following equation:

$$(M_{mot}-M_{drag})=-M_0-(M_0+M_u)\exp(-(t-t_u)/T_{mot})$$

The areas $S_1$ and $S_2$ are calculated as follows:

$$S_1 = M_0 t_u - \int_0^{t_u} M_{mot} dt = (M_0 + M_{drag})t_u + T_{mot}(M_{drag} + M_0)(\exp(-t_u/T_{mot}) - 1)$$

$$S_2 = (M_0 - M_u)\int_0^{\infty} \exp(-t/T_{mot}) dt = -T_{mot}(M_{drag} + M_0)(\exp(-t_u/T_{mot}) - 1)$$

The total change in kinetic torque is as follows:

$$S=S_1+S_2=(M_0+M_{drag})t_u$$

Figure 3A:
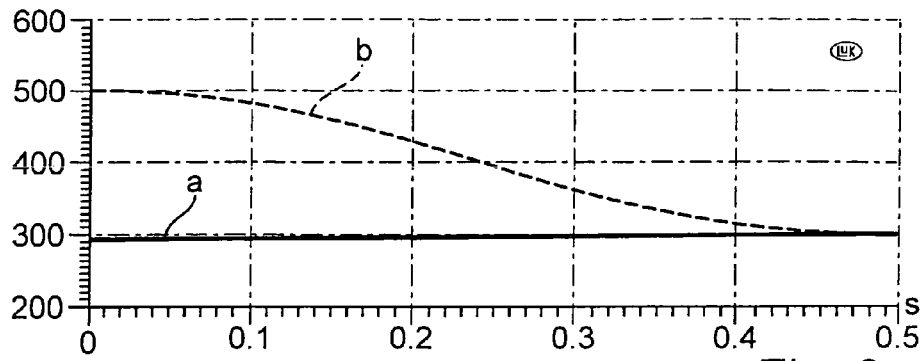
FIG. 3a shows curves for the set point rpm and the rotational speed of the engine over time with optimum engine control according to the present invention.

FIG. 3a shows the curves for the set point rpm a) and the rotational speed b) of the engine over time. These curves are obtained with optimum engine control according to the present invention.

Figure 3B:
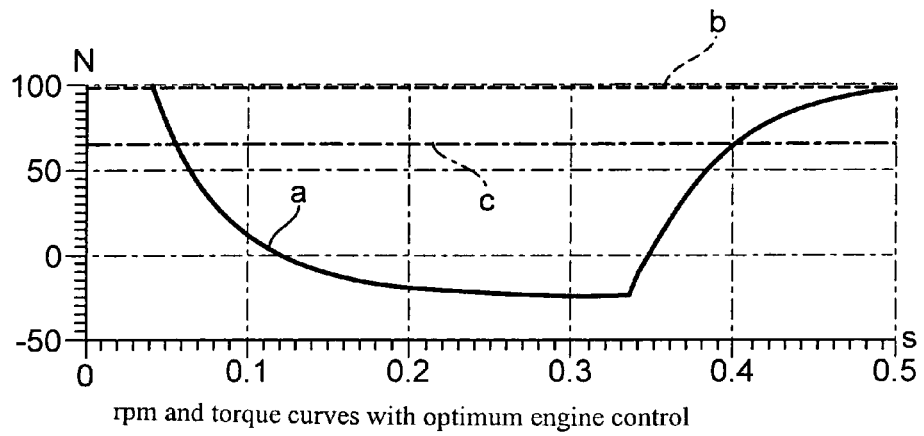
FIG. 3b shows curves for the torques of the engine and clutch over time with optimum engine control according to the present invention.

FIG. 3b shows the curves for the engine torque a) and the clutch torque b) as well as the output torque c) over time; these are the curves obtained with optimum engine control according to the present invention.

Figure 4:
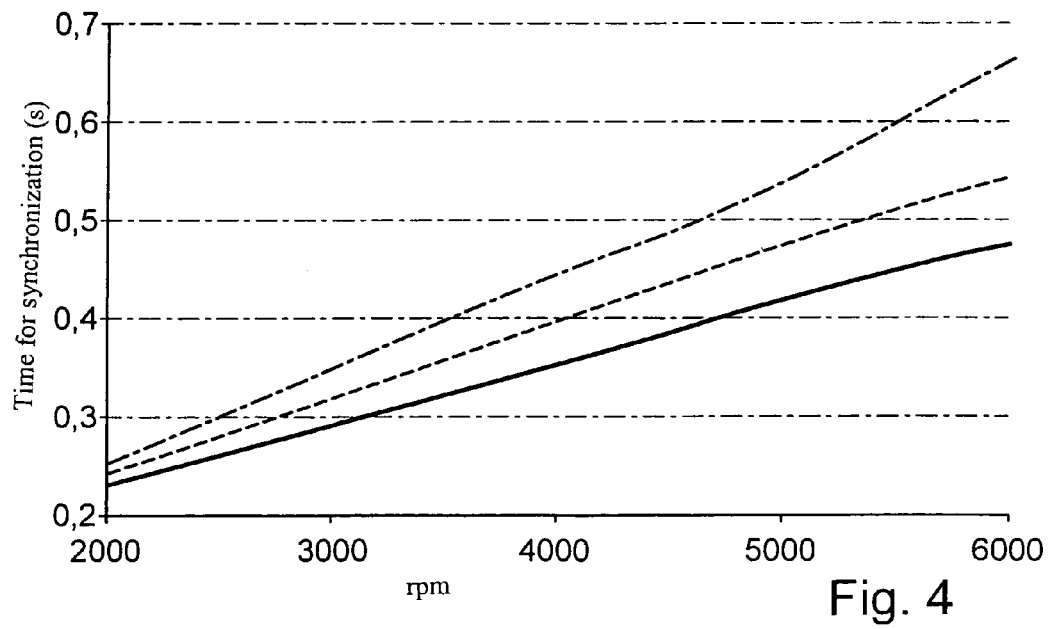
FIG. 4 shows various curves of the time for synchronization over the rpm with optimum control.

FIG. 4 shows various curves of the time for synchronization over the rpm with optimum control, the top curve showing the time for synchronization at a torque of 75 Nm, the middle curve showing the time for synchronization at a torque of 100 Nm and the bottom curve showing the time for synchronization at a torque of 125 Nm.

As FIG. 4 shows, the strategy at a moderate rpm is barely inferior to optimum control. Only above 5000 rpm are the advantages of optimum control clearly manifest. In the extreme case (6000 rpm) optimum control is 0.06 s faster. Since the output torque does not change during synchronization, no comfort problems need be expected in this case.

FIG. 4 shows the calculated times for synchronization over the rpm and load for a 1–2 shift. Two clear trends are discernible. The time required for synchronization increases with the rpm difference to be overcome (and accordingly with the rpm of engine 1) and decreases with an increase in load.

Figure 5A:
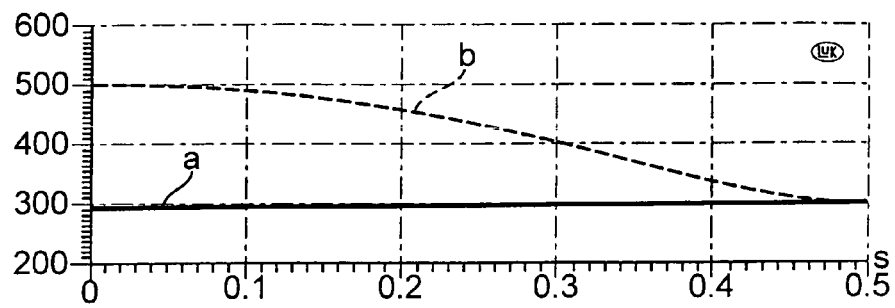
FIG. 5a shows curves for the set point rpm and the rotational speed of the engine over time.
Figure 5B:
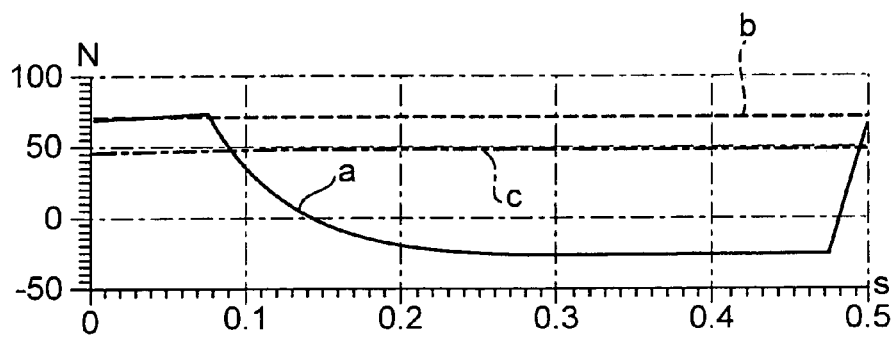
FIG. 5b shows curves for engine torque, clutch torque, and output torque over time.

FIGS. 5a and 5b show a typical synchronization operation. In FIG. 5a, the curves for set point rpm a) and rotational speed b) of the engine are plotted over time.

FIG. 5b shows the curves for engine torque a), clutch torque b), and output torque c) over time as obtained with a synchronization strategy according to the present invention.

Figure 6:
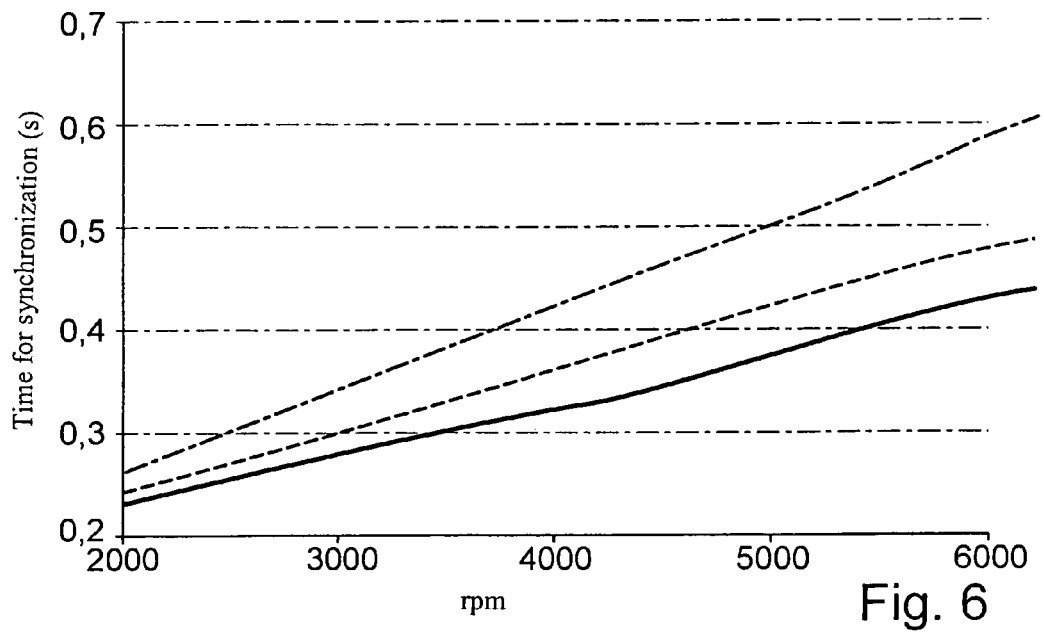
FIG. 6 shows various curves of the time for synchronization over the rpm with a limit to the change in clutch torque on the power-shift clutch of 30 Nm/s with optimum power-shift clutch control and engine control.

FIG. 6 shows various curves of the time for synchronization over the rpm, the upper curve showing the time for synchronization at a torque of 75 Nm, the middle curve showing the time for synchronization at a torque of 100 Nm, and the bottom curve showing the time for synchronization at a torque of 125 Nm. The change in the clutch torque on the power-shift clutch is limited to 30 Nm/s, an optimum power-shift clutch control and engine control according to the method of the present invention being used.

Figure 7:
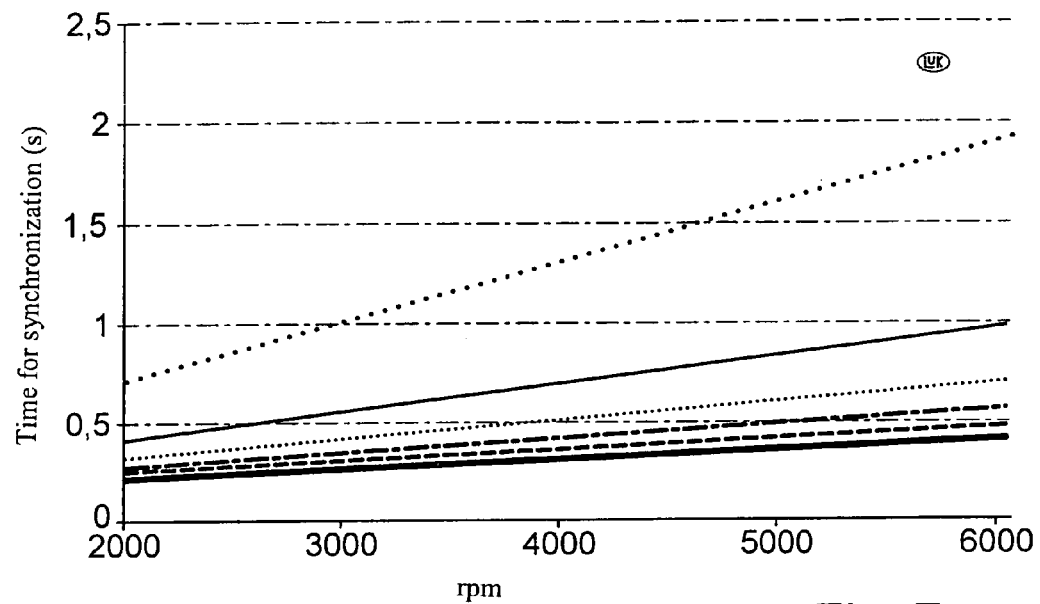
FIG. 7 shows various curves of the time for synchronization over the rpm according to an estimate.

FIG. 7 shows various curves of the time for synchronization over the rpm according to an estimate, showing the time for synchronization at a torque of 0 Nm, 25 Nm, 50 Nm, 75 Nm, 100 Nm, and 125 Nm for the upper curve to the bottom curve, respectively.

The resulting times are calculated on the basis of the values for $J_{mot}=0.176$ kgm$^2$, $M_{drag}=25$ Nm, $i_1=3.27$, and $i_2=1.92$. It may be seen here that the estimate corresponds very well to the times actually achievable and that at low loads the time may be very long.

Figure 8A:
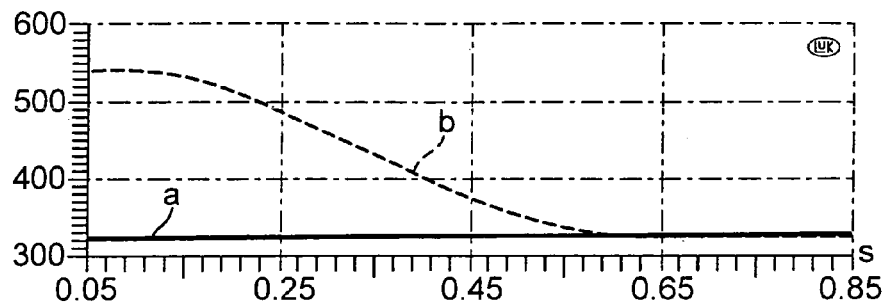
FIG. 8a shows curves for the set point rpm and the rotational speed of the engine over time.
Figure 8B:
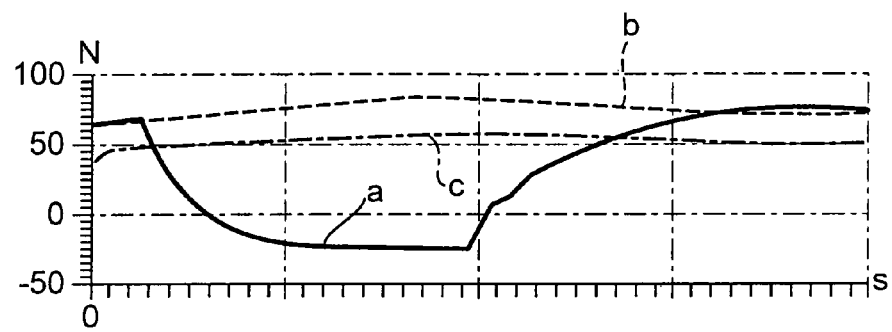
FIG. 8b shows curves for the engine torque, the clutch torque, and the output torque over time.

FIGS. 8a and 8b show a typical synchronization operation, FIG. 8a showing curves for set point rpm a) and rotational speed b) of the engine over time.

FIG. 8b shows curves for engine torque a), clutch torque b), and output torque c) over time.

Figure 9:
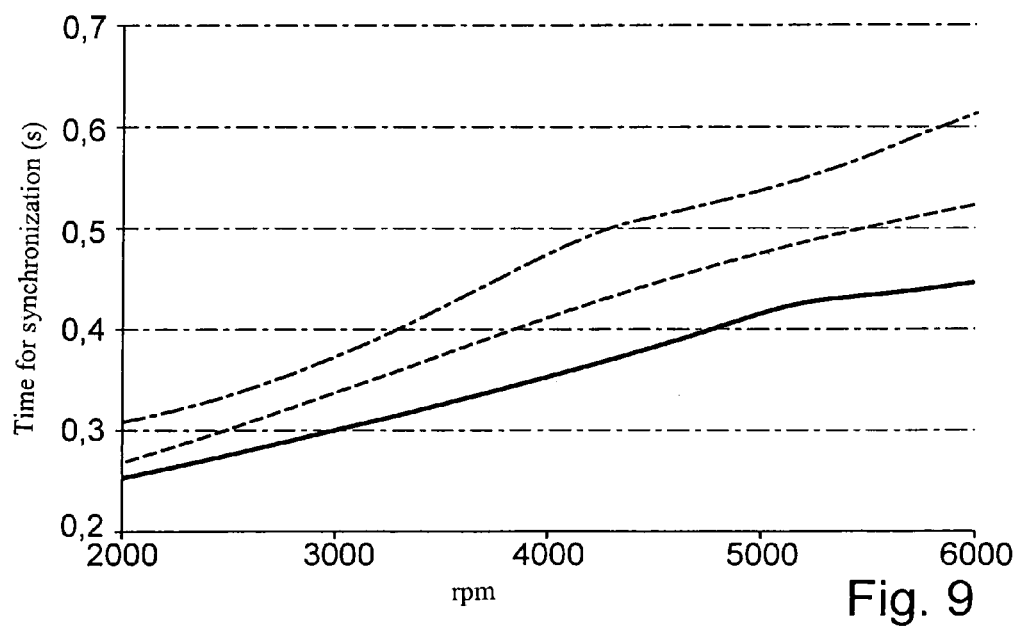
FIG. 9 shows various curves of the time for synchronization over the rpm with a limit to the change in the clutch torque on the power-shift clutch of 30 Nm/s by a power-shift clutch control and engine control.

FIG. 9 shows the various curves of the time for synchronization over rpm, the upper curve showing the time for synchronization at a torque of 75 Nm, the middle curve showing the time for synchronization at a torque of 100 Nm, and the lower curve showing the time for synchronization at a torque of 125 Nm.

The change in clutch torque on the power-shift clutch is limited to 30 Nm/s here. The calculated and plotted times are obtained by a power-shift clutch control and engine control according to the present invention for synchronization of rpm and applied load.

Figure 10:
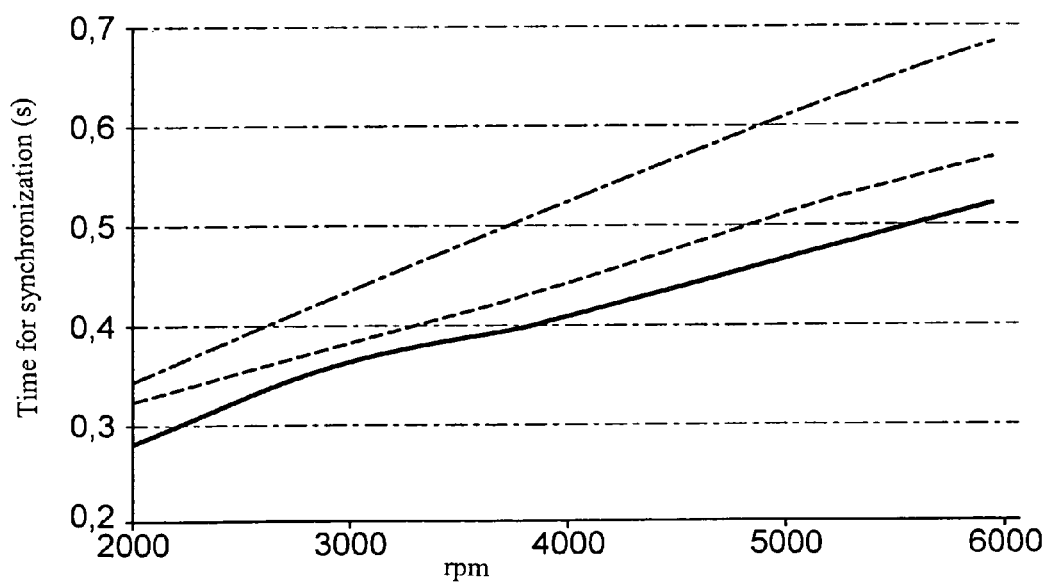
FIG. 10 shows various curves of the time for synchronization over the rpm with a limit to the change in the clutch torque on the power-shift clutch of 30 Nm/s by a power-shift clutch control and engine control with a dead time of the engine of 0.1 s.
Figure 11A:
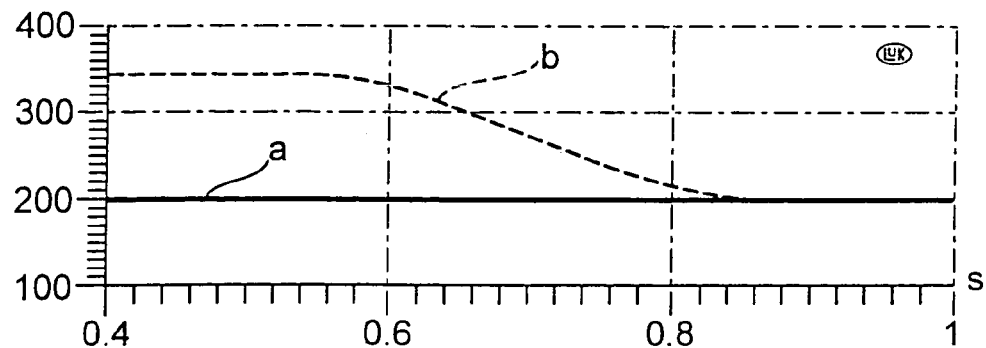
FIG. 11a shows curves for the set point rpm and the rotational speed of the engine over time with simple regulation with a dead time.
Figure 11B:
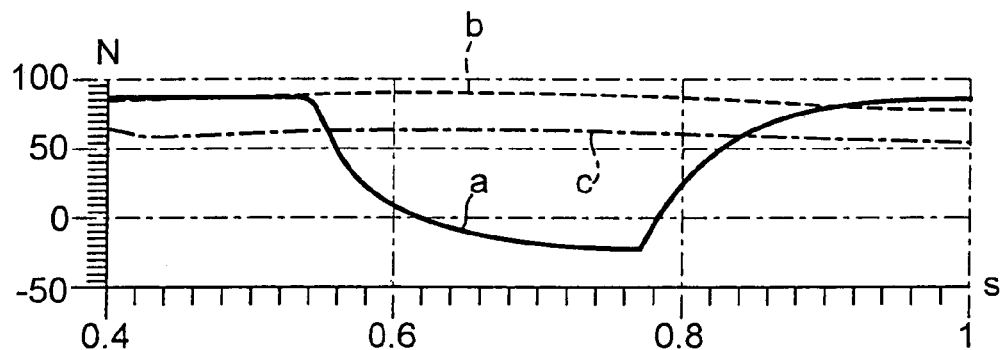
FIG. 11b shows curves for the engine torque, the clutch torque, and the output torque over time with simple regulation with a dead time.

It is assumed here that no noticeable dead time occurs in the control. In reality, however, there is a certain dead time. If this is known, it does not change anything in terms of the optimum control but it does change the regulation described here. In this case, a similar regulation has been developed. The only difference is that the switch to the final regulation by the power-shift clutch regulator takes place on exceeding a threshold which depends on rpm and load and has been stored as an engine characteristics map. Dead time in the simulation is 0.1 s. The corresponding simulation results are shown in FIGS. 10, 11a, and 11b. This shows that the method according to the present invention achieves optimum control of the synchronization operation with respect to speed.

The top curve in FIG. 10 shows the time for synchronization at a torque of 75 Nm, the middle curve shows the time for synchronization at a torque of 100 Nm, and the lower curve shows the time for synchronization at a torque of 125 Nm.

FIG. 11a shows curve a) for the set point rpm and curve b) for the rotational speed of the engine.

FIG. 11b shows the curve for the engine torque as a), the curve for the clutch torque as b), and the curve for the output torque as c).

Figure 12:
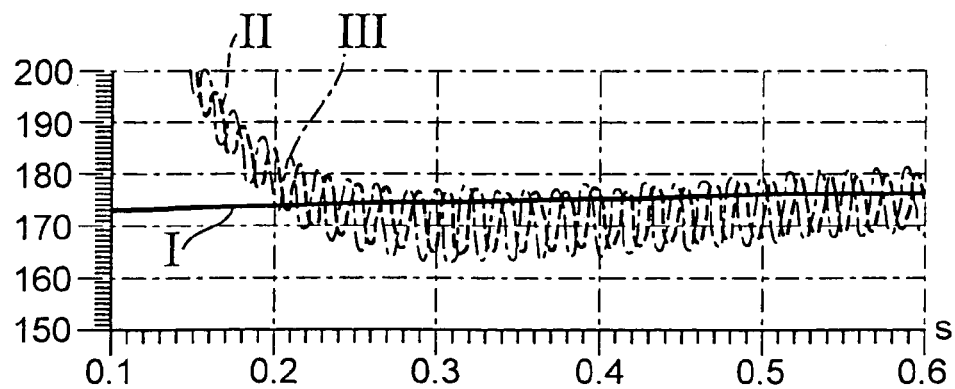
FIG. 12 shows curves for the set point rpm, the rotational speed of the transmission input shaft, and the rotational speed of the engine over time when using a conventional damper.

FIG. 12 shows the influence of rpm irregularity when using a conventional damper, with the curves for set point rpm (I), rotation speed (II) of the transmission input shaft, and rotational speed (III) of the engine over time.

Figure 13:
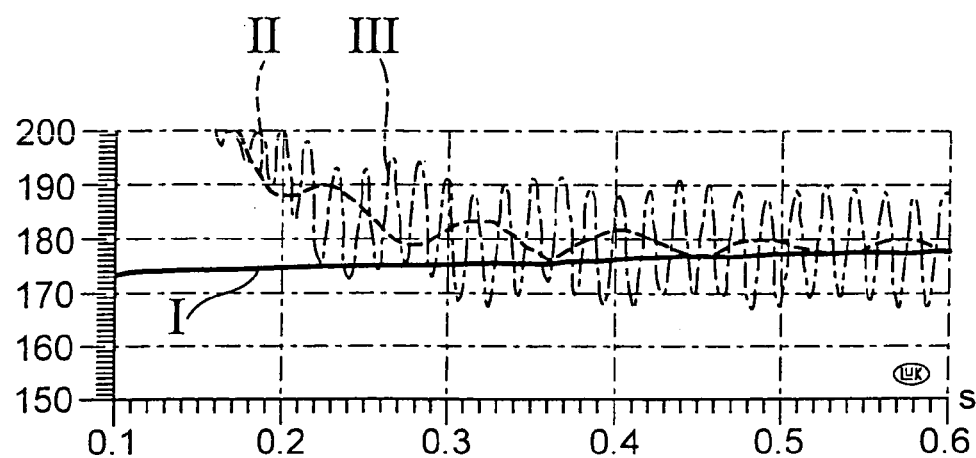
FIG. 13 shows curves for the set point rpm, the rotational speed of the transmission input shaft, and the rotational speed of the engine over time when using an arc spring damper according to the present invention.

However, FIG. 13 shows the influence of rpm irregularity when using a DMF-like damper or an arc spring damper according to the present invention. It may be seen here that as with a normal DMF the irregularity of the engine (curve III) increases. The movement of the transmission input (curve II) that is to be synchronized is definitely calmed, however. This permits form-fitting shifting.

Possible configurations of a "DMF damper" are shown in FIGS. 14 through 17.

Figure 14:
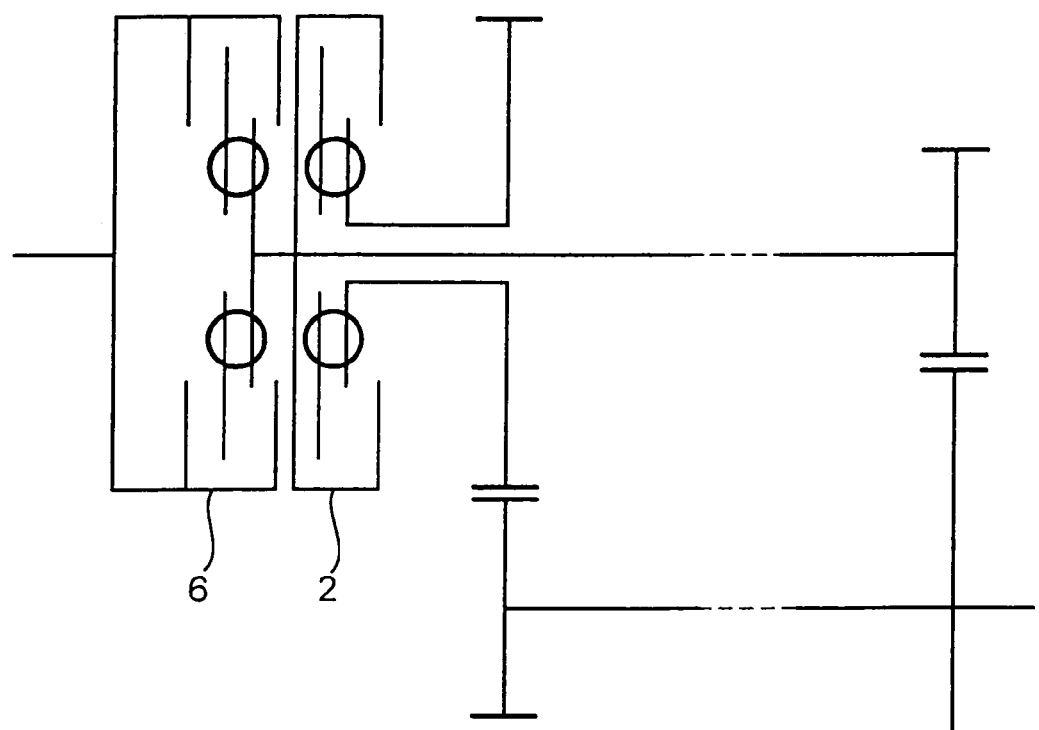
FIG. 14 shows a partial view of a drive train having torsion-damped clutch disks.

FIG. 14 shows torsion-damped clutch disks of power-shift clutch 2 and low-gear clutch 6.

Figure 15:
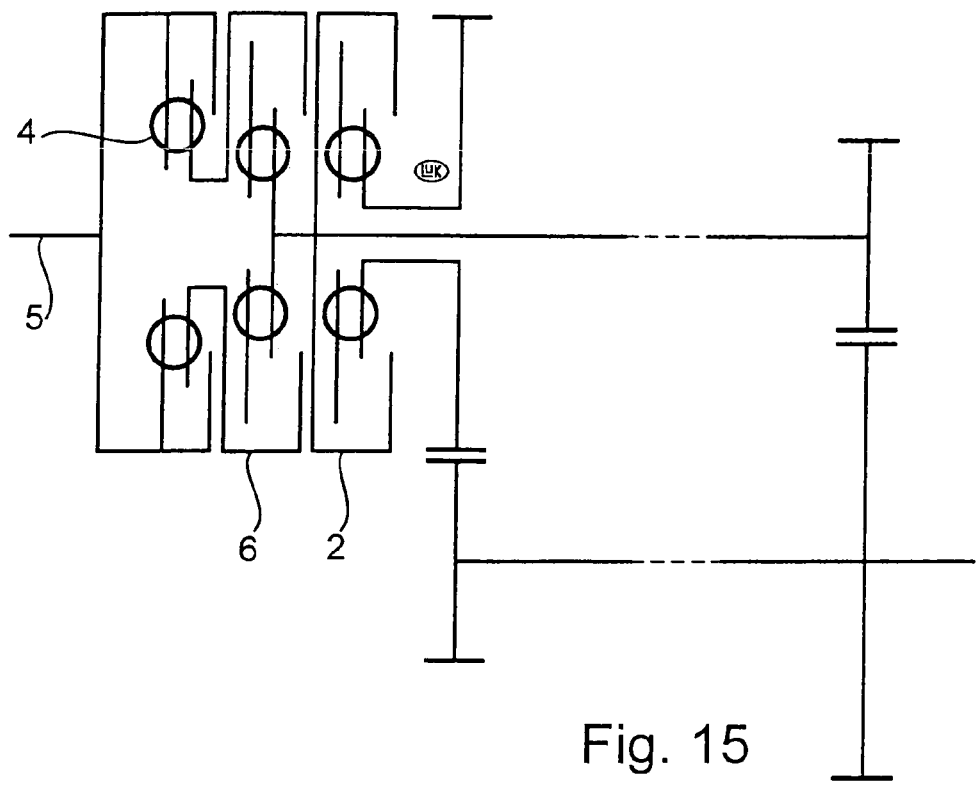
FIG. 15 shows a partial view of a drive train having a torsion damper according to the present invention between the crankshaft and the low-gear clutch.
Figure 16:
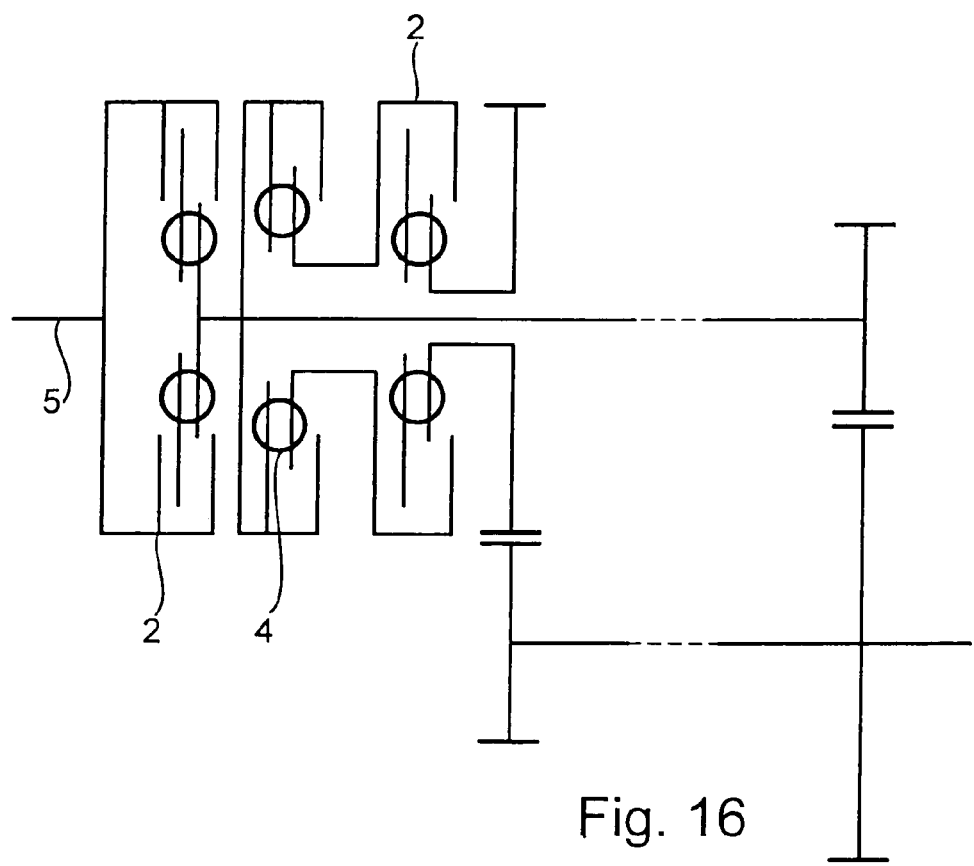
FIG. 16 shows a partial view of a drive train having a torsion damper according to the present invention between the power-shift clutch and the low-gear clutch and FIG. 17 shows a partial view of a drive train having a torsion damper according to the present invention downstream from the power-shift clutch.
Figure 17:
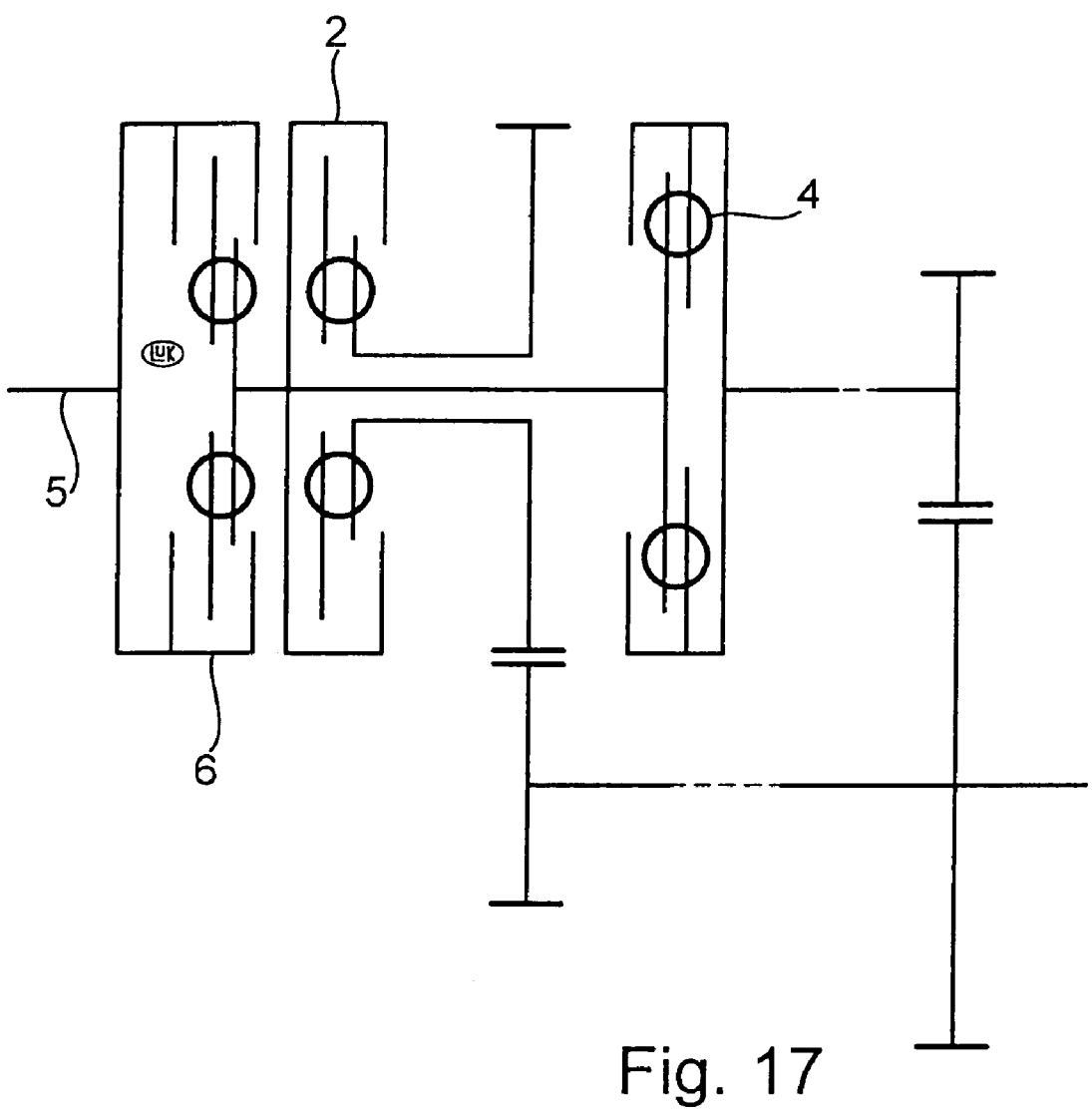

FIGS. 15 through 17 show different configurations of DMF damper 104 in the drive train of the transmission. FIG. 15 shows the DMF damper upstream from the two clutches, namely between crankshaft 5 of engine 1 and low-gear clutch 6. However, in FIG. 16 damper 4 is provided between the aforementioned clutches. The advantage of this design is that the masses of the two clutches already being used for the DMF damper are also used here.

FIG. 17 shows the configuration of DMF damper 4 downstream from clutches 2 and 6. DMF damper 4 is implemented in the transmission in this way. This configuration is appropriate in particular if the mass of an electric engine implemented in the transmission may also be used as a secondary part of the damper.

In all cases, adequate isolation of vibration may be ensured through an appropriate choice of the masses and rigidities.

What is claimed is:

1. A method for operating a transmission of a vehicle having an engine and a clutch, the method comprising:
   synchronizing the transmission; and
   suitably controlling at least one of the engine and the clutch during the synchronizing, wherein the transmission is a seamless transmission and the clutch is a power-shift clutch, and wherein the controlling includes controlling the engine so as to transfer a constant torque from the power-shift clutch to the vehicle.

2. The method as recited in claim 1, wherein the controlling includes switching a set point of an engine torque in a quick manner.

3. The method as recited in claim 2, wherein the synchronizing includes a first phase, in which the set point is set so as to have a large difference from an initial engine torque, and a second phase, in which the set point returns to the initial engine torque.

4. The method as recited in claim 1, wherein the synchronizing includes synchronizing a gear to be shifted using an engine control.

5. The method as recited in claim 4, further comprising setting a set point of an engine torque to zero using the engine control during an upshifting of the transmission wherein a drag torque acts independently of the engine control.

6. The method as recited in claim 4, further comprising setting a set point of an engine torque to be equal to a maximum engine torque in the engine control during a downshifting of the transmission.

7. The method as recited in claim 4, wherein a set point of an engine torque is switched by the engine control at a point in time, the point in time of the switching being a function of at least one of an rpm difference to be synchronized and an applied load.

8. The method as recited in claim 7, wherein the point in time is determined from an engine characteristics map.

9. The method as recited in claim 7, wherein the point in time of the switching for an upshifting of the transmission is determined using the formula:

$$t_u = \frac{J_{mot} \cdot \Delta\omega_{mot}}{M_0}$$

wherein
$t_u$=point in time of the switching,
$J_{mot}$=inertia of the engine,
$\Delta\omega_{mot}$=rpm difference to be synchronized, and
$M_0$=initial torque of the engine.

10. The method as recited in claim 9, wherein the formula is used when a time constant of the engine for an increase in torque and a time constant of the engine for a decrease in torque are identical.

11. The method as recited in claim 7, wherein the point in time of the switching for a downshifting of the transmission is determined using the formula:

$$t_u = \frac{J_{mot} \cdot \Delta\omega_{mot}}{M_0 - M_{\max}}$$

wherein
$M_{max}$=a maximum engine torque,
$t_u$=point in time of the switching,
$J_{mot}$=inertia of the engine,
$\Delta\omega_{mot}$=rpm difference to be synchronized, and
$M_0$=initial torque of the engine.

12. The method as recited in claim 11, wherein the formula is used when a time constant of the engine for an increase in torque and a time constant of the engine for a decrease in torque are identical.

13. The method as recited in claim 7, wherein, up to the point in time of the switching, the engine torque changes according to the following equation:

$$(M_{mot}-M_{drag})=-M_{drag}+(M_{drag}+M_0)\exp(-t/T_{mot})$$

wherein
$M_{mot}$=engine torque,
$M_{drag}$=drag torque,
$M_0$=initial engine torque, and
$T_{mot}$=time constant of the engine torque.

14. The method as recited in claim 7, wherein, at the point in time of the switching, the engine torque is determined by the following equation:

$$(M_{mot}-M_{drag})=-M_{drag}+(M_{drag}+M_0)\exp(-t/T_{mot})$$

wherein
$M_{mot}$=engine torque,
$M_{drag}$=drag torque,
$M_0$=initial engine torque,
$t_u$=point in time of the switching, and
$T_{mot}$=time constant of the engine torque.

15. The method as recited in claim 7, wherein after the point in time of the switching, the engine torque changes according to the equation:

$$(M_{mot}-M_{drag})=M_0-(M_0-M_u)\exp(-(t-t_u)/T_{mot}).$$

16. The method as recited in claim 7, wherein a change in kinetic torque is derived using the equation:

$$S=S_1+S_2=(M_0+M_{drag})t_u$$

where it holds that $$S_1 = M_0 t_u - \int_0^{t_u} M_{mot} dt$$
$$= (M_0 + M_{drag})t_u + T_{mot}(M_{drag} + M_0)(\exp(-t_u/T_{mot}) - 1)$$
$$S_2 = (M_0 - M_u)\int_0^{\infty} \exp(-t/T_{mot}) dt$$
$$= -T_{mot}(M_{drag} + M_0)(\exp(-t_u/T_{mot}) - 1)$$

wherein
S=change in kinetic torque
$S_1$=change in kinetic torque prior to $t_u$
$S_2$=change in kinetic torque after $t_u$
$M_0$=initial engine torque,
$M_{drag}$=drag torque
$M_u$=engine torque at the point in time of the switching,
$t_u$=point in time of the switching, and
$T_{mot}$=time constant of the engine torque.

17. The method as recited in claim 16, wherein the point in time of the switching is determined by an rpm difference to be synchronized according to the equation:

$$t_u = \frac{J_{mot}\Delta\omega_{mot}}{M_0 + M_{drag}} = \frac{J_{mot}\Delta\omega_{mot}}{M_{mot\_0}}$$

wherein
$M_{mot\_0}=M_0+M_{drag}$ where $M_0$=initial engine torque and $M_{drag}$=drag torque
$J_{mot}$=inertia of the engine, and
$\Delta\omega_{mot}$=rpm difference to be synchronized.

18. The method as recited in claim 7, wherein, when a time constant of the engine for an increase in torque and a time constant of the engine for a decrease in torque are different and a rpm difference is small, the point in time of switching is defined by the following equations:

$$\tau + \exp(-\tau) - \alpha\exp(-\alpha\tau) = c$$

$$\tau = t_u/T_{mot}^-, \ \alpha = T_{mot}^+/T_{mot}^-, \ c = \frac{J_{mot}\Delta\omega_{mot}}{M_0 T_{mot}^-} + 1 - \alpha$$

wherein
$M_0$=initial engine torque
$t_u$=point in time of the switching, and
$T_{mot}^-$=time constant of the engine for a decrease in torque
$T_{mot}^+$=time constant of the engine for an increase in torque
$J_{mot}$=inertia of the engine, and
$\Delta\omega_{mot}$=rpm difference to be synchronized.

19. The method as recited in claim 18, wherein, when a time constant of the engine for an increase in torque and a time constant of the engine for a decrease in torque are different, the areas $S_1$ and $S_2$ are calculated as follows:

$$S_1=(M_0+M_{drag})t_u+T_{mot}^-(M_0+M_{drag})(\exp(-t_u/T_{mot}^-)-1)$$

$$S_2=T_{mot}^+(M_0+M_{drag})(\exp(-t_u/T_{mot}^+)-1)$$

wherein
$M_0=M_{set\ point}-M_{drag}$
$M_0$=torque on the engine shaft
$M_{set\ point}$=engine set point torque
$M_{drag}$=engine drag torque.

20. The method as recited in claim 18, wherein for the point in time ($t_u$) of switching, the following equations hold:

$$S_1 + S_2 = J_{mot}\Delta\omega_{mot} \text{ and/or}$$

$$\frac{t_u/T_{mot}^- + \exp(-t_u/T_{mot}^-) - 1 - }{T_{mot}^+/T_{mot}^-(\exp(-t_u/T_{mot}^+) - 1)} = \frac{J_{mot}\Delta\omega_{mot}}{(M_0 + M_{drag})T_{mot}^-}$$

wherein $$\tau = t_u/T_{mot}^-, \ \alpha = T_{mot}^+/T_{mot}^-, \ c = \frac{J_{mot}\Delta\omega_{mot}}{(M_0 + M_{drag})T_{mot}^-} + 1 - \alpha$$

and for parameter $\tau$ it holds that:

$$\tau+\exp(-\tau)-\alpha\exp(-\alpha\tau)=c$$

and for parameter $\alpha$ it holds that $1\leq\alpha\leq 2$.

21. The method as recited in claim 20, wherein at values of $\alpha=1$ and $\tau=c$, the point in time ($t_u$) is calculated using the following equation:

$$t_u = \frac{J_{mot}\Delta\omega_{mot}}{M_0 + M_{drag}} = \frac{J_{mot}\Delta\omega_{mot}}{M_{mot\_0}}$$

22. The method as recited in claim 21, wherein at values of c>4 the point in time ($t_u$) of the switching is calculated using the following equation:

$$t_u = \frac{J_{mot}\Delta\omega_{mot}}{(M_0 - M_{sync})}.$$

23. The method as recited in claim 22, further comprising calculating and storing an engine characteristics map for the function exp(−c).

24. A method for operating a transmission of a vehicle having an engine and a clutch, the method comprising:
synchronizing the transmission; and
suitably controlling at least one of the engine and the clutch during the synchronizing, wherein the transmission is a seamless transmission and the clutch is a power-shift clutch, and wherein the controlling includes controlling the power-shift clutch and the engine;
wherein
$M_{mot}$=engine torque,
$M_{drag}$=drag torque,
$M_0$=initial engine torque,
$M_u$=engine torque at the point in time of the switching,
$t_u$=point in time of the switching, and
$T_{mot}$=time constant of the engine torque.

25. The method as recited in claim 24, wherein the synchronizing includes a implementing a simple control during a first phase of the synchronizing, and during a second phase of the synchronizing, setting a set point of an engine torque to an initial value and adjusting the set point at the power-shift clutch.

26. The method as recited in claim 25, further comprising switching the set point of the engine torque at least twice during the first phase.

27. The method as recited in claim 26, wherein a first switching is performed at the beginning of the synchronizing.

28. The method as recited in claim 27, wherein during an upshifting of the transmission, the set point is switched to zero and a clutch torque is increased quickly.

29. The method as recited in claim 27, wherein during a downshifting of the transmission, the set point value is switched to a maximum engine torque and a clutch torque is reduced quickly.

30. The method as recited in claim 26, further comprising performing additional switching of the set point of the engine torque at different times, the engine torque being switched to a maximum value during upshifting and to a value of zero during downshifting and reducing a clutch torque on the power-shift clutch during upshifting and rapidly increasing the clutch torque during downshifting.

31. The method as recited in claim 26, wherein a point in time of the switching is determined from at least one of a value stored in memory and a characteristics map, wherein the characteristics map depends on at least one of an initial load and an rpm difference to be synchronized.

32. The method as recited in claim 31, wherein an applied rpm difference and the initial load have an influence on the point of time of switching, the influence being taken into account through the following equation:

$$J_{mot}\,\omega^* = -|M_{drag}| - M_{LSK}.$$

33. The method as recited in claim 32, wherein under an assumption that an rpm of the vehicle does not change during a shifting operation, the following equation is obtained:

$$\Delta t = \frac{\pi n}{30} \cdot \left(1 - \frac{i_2}{i_1}\right) \cdot \frac{J_{mot}}{|M_{drag}| + M_{mot\_0}}.$$

34. The method as recited in claim 33, wherein a time for synchronization is determined using the following equation, taking into account a time constant of the engine control:

$$\Delta t = \frac{\pi n}{30} \cdot \left(1 - \frac{i_2}{i_1}\right) \cdot \frac{J_{mot}}{|M_{drag}| + M_{mot\_0}} + 2T_{mot}.$$

35. The method as recited in claim 34, wherein a second phase of synchronization is begun as soon as a set point/actual rpm difference has dropped below a threshold.

36. The method as recited in claim 35, wherein the engine torque is asymptotically altered to the initial value in the second phase and the power-shift clutch is influenced by a simple regulation so that a remaining rpm difference is smoothed out.

37. The method as recited in claim 36, wherein one of a PI regulator or a PID regulator is used for the regulation.

38. The method as recited in claim 35, wherein the threshold is determined from the engine characteristics map which depends on the initial load and the rpm difference to be synchronized and wherein the threshold is stored.

39. The method as recited in claim 26, wherein a point in time of the switching is determined using a computation model.

40. The method as recited in claim 39, wherein the computation model uses the following motion equations:

$$J_{mot}\omega^*_{mot} = M_{mot} - M_{LSK} - M_{drag}$$

$$J_{Fzg}\omega^*_{Fzg} = M_{LSK}i_{LSK} - M_{FW}$$

wherein
$M_{mot}$=controllable engine torque;
$M_{LSK}$=controllable clutch torque of the power-shift clutch;
$i_{LSK}$=transmission ratio of the power-shift clutch;
$M_{drag}$=uncontrollable drag torque;
$M_{FW}$=rolling resistance converted into torque;
$J_{Fzg}$=moment of inertia of the vehicle;
$J_{mot}$=moment of inertia of the engine;
$\omega^*_{mot}$=acceleration of the engine output shaft;
$\omega^*_{Fzg}$=acceleration of the transmission output shaft.

41. The method as recited in claim 39, wherein the engine and the power-shift clutch are each described as being a PT1 element in the computation model.

42. The method as recited in claim 39, wherein equations of the computation model depend on at least one of a first and a second switching time and a total time such that, at a predetermined total time, the equations of the computation model are solved explicitly for the first and second switching times.

* * * * *

UNITED STATES PATENT AND TRADEMARK OFFICE
CERTIFICATE OF CORRECTION

PATENT NO. : 7,139,654 B2
APPLICATION NO. : 10/485973
DATED : November 21, 2006
INVENTOR(S) : Alexander Fidlin, Boris Serebrennikov and Gunter Hirt It is certified that error appears in the above-identified patent and that said Letters Patent is hereby corrected as shown below:

Column 15, at the end of claim 15, after line 25, insert the following text:
-- wherein
    Mmot= engine torque,
    Mdrag= drag torque,
    M0= initial engine torque,
    Mu= engine torque at the point in time of the switching,
    tu= point in time of the switching, and
    Tmot= time constant of the engine torque.--

Column 17, claim 24, line 13, cancel the text beginning with "wherein" to and ending "time constant of the engine torque." in column 17, line 19.

Signed and Sealed this

Twentieth Day of March, 2007

JON W. DUDAS
*Director of the United States Patent and Trademark Office*